United States Patent
Serkh et al.

[11] Patent Number: 5,964,674
[45] Date of Patent: *Oct. 12, 1999

[54] BELT TENSIONER WITH BOTTOM WALL OF BASE JUXTAPOSED PIVOT ARM

[75] Inventors: Alexander Serkh, Windsor, Canada; H. W. Oberg, Lakewood, Colo.

[73] Assignee: The Gates Corporation, Denver, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/828,216

[22] Filed: Mar. 21, 1997

[51] Int. Cl.[6] .................................. F16H 7/08; F16H 7/12
[52] U.S. Cl. ........................ 474/109; 474/101; 474/135
[58] Field of Search ...................... 474/101, 109, 474/112, 133, 135

[56] References Cited

U.S. PATENT DOCUMENTS

| | | | |
|---|---|---|---|
| 4,472,162 | 9/1984 | Hitchcock | 474/135 |
| 4,473,362 | 9/1984 | Thomey et al. . | |
| 4,551,120 | 11/1985 | Thomey | 474/112 X |
| 4,689,037 | 8/1987 | Bytzek | 474/135 |
| 4,696,663 | 9/1987 | Thomey et al. | 474/133 |
| 4,698,049 | 10/1987 | Bytzek et al. | 474/135 |
| 5,342,249 | 8/1994 | Gardner et al. | 474/135 |
| 5,443,424 | 8/1995 | Henderson | 474/135 |
| 5,449,328 | 9/1995 | Schmidt et al. . | |
| 5,458,541 | 10/1995 | Adler et al. . | |
| 5,462,494 | 10/1995 | Rogalla | 474/135 |
| 5,503,599 | 4/1996 | Brehler et al. | 474/135 X |
| 5,599,245 | 2/1997 | Giese | 474/135 |
| 5,620,385 | 4/1997 | Cascionale et al. | 474/112 |
| 5,632,697 | 5/1997 | Serkh | 474/135 X |
| 5,647,813 | 7/1997 | Serkh | 474/135 |
| 5,702,314 | 12/1997 | Schmid | 474/135 X |

FOREIGN PATENT DOCUMENTS

| 4223324 | 1/1994 | Germany | 474/112 |
|---|---|---|---|

Primary Examiner—Daniel P. Stodola
Assistant Examiner—Gregory J. Strimbu
Attorney, Agent, or Firm—C. H. Castleman, Esq.; S. G. Austin, Esq.; H. W. Oberg, Esq.

[57] ABSTRACT

A belt tensioner of the Zed type with a base member, a pivot-arm, a pivot-pin, a pulley attached to the pivot-arm, a torsional spring attached between the base member and pivot-arm, and wherein the base member has a "tube pan" shape with a cantilevered inner wall that supports the pivot-pin, a cantilevered outer wall, and a bottom wall interconnecting the inner and outer walls and oriented with the bottom wall juxtaposed the pivot-arm. Optionally, the spring is connected to a damping mechanism that generates a reaction force in generally the same direction as a belt force or hub load. In another embodiment, a second, damping spring generates a reaction force in generally the same direction as the belt force with a constant damping force.

16 Claims, 3 Drawing Sheets

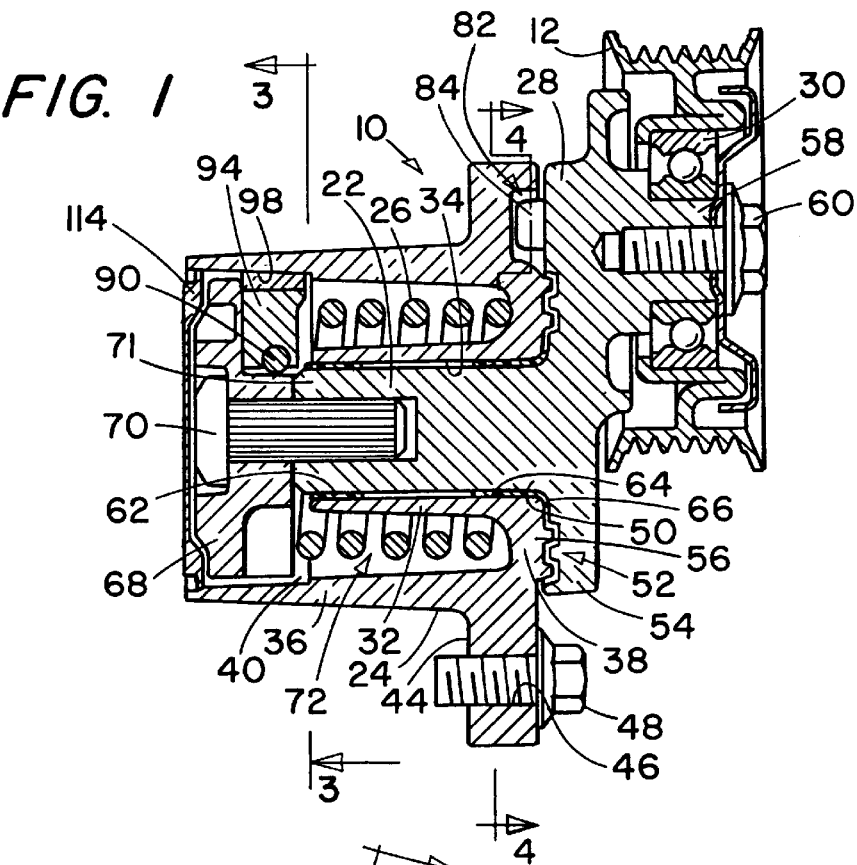
FIG. 1
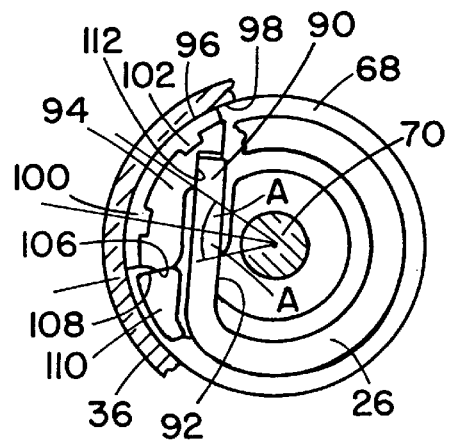
FIG. 3
FIG. 2

BELT TENSIONER WITH BOTTOM WALL OF BASE JUXTAPOSED PIVOT ARM

BACKGROUND OF THE INVENTION

The invention relates to a tensioner with a torsional spring that biases the position of a pivot-arm to which a belt engaging pulley is attached, but more particularly, the invention relates to a tensioner of the "Zed" type where a radial center plane for the pulley is laterally offset from an axis for a pivot-pin and about which the pivot-arm oscillates.

An example of a "Zed" type tensioner is disclosed in U.S. Pat. No. 4,473,362 where the tensioner has a pivot-arm attached to an offset cylindrical member that supports the pivot-arm and rotates about a pivot secured to a base. A torsional spring is used where one end of the spring is constrained at two points by a connection to the pivot-arm, and the other end of the spring is constrained by a connection at the base. A single sleeve-type bushing on the pivot has a bearing surface that supports the cylindrical member connected to the pivot-arm. A housing surrounds and defines an annulus for the spring. The stacked annular walls of the tensioner's spring housing together with a cylindrical shaped damping mechanism located radially inwardly of the spring, tend to make the housing of the tensioner bulky for a tensioner that imparts modest tension (e.g. 50 lbs.) and damping (e.g. 30–40%) into a power transmission belt of a front-end accessory belt drive. Another problem associated with the '362 tensioner is that unequal pressure loads introduced to a single bearing surface of the bushing can result in uneven bushing wear and attendant pulley misalignment.

A tensioner design that reduces bulk while providing comparable belt tensioning capability (e.g. 50 lbs. belt tension) with a comparable pivot-arm length, is disclosed in U.S. Pat. Nos. 5,449,328 and 5,458,541 and which have the same assignee (INA Walslager Schefseffler Kg). The "INA" tensioners are more compact than the tensioner of the '362 patent in that the INA tensionsers exclude the requirement for stacked annular walls at a spring housing. A representation of the INA tensioners as disclosed in the '328 and '541 patents is herein represented by FIG. 6.

Referring to FIG. 6, the prior art tensioner includes a pivot-arm, a pivot-pin connected on one side of the pivot-arm, a base member of generally "tube-pan" shape with two bushings that support the pivot-pin, a disc type damping mechanism, and a torsional spring with one end constrained at two points by the pivot-arm, and an opposite end constrained at two points by the base. The points for constraining the ends of the torsional spring are not used in conjunction with a mechanism to generate a force to help balance a hub load which must be supported by the bushings. The base member includes a cantilevered inner wall, a cantilevered outer wall and a bottom wall interconnecting the inner and outer walls. An annular spring receiving cavity is defined between the inner and outer walls. The bottom wall of the base faces an open end of the base member located next to the pivot-arm. With such an arrangement, the pivot-pin is supported in a cantilevered fashion by the inner wall of the base and wherein the bottom wall, which supports the cantilevered inner wall, is spaced a maximum distance away from a radial center plane of the pulley. The spacing of the bottom wall impairs rigidity of the inner wall for supporting the pivot-pin and maintaining good pulley alignment. The constrained connection of the spring ends to the pivot-arm and base results in a bearing loading that permits the pivot-pin to "cock" or become misaligned with bearing wear because loads to the bearing surfaces are in opposite directions and are significantly higher than a load imparted at the pulley by a tenionsed belt.

While the INA tensioner is of a good compact design for reduced bulk it also has inherent alignment and stiffness problems due to: the orientation of the base with its open-end facing the pivot-arm and its bottom wall spaced a maximum distance from the pulley; the spring hook-up at one end with two points directly constrained by the pivot-arm and at the other end with two points directly constrained to the base; and a flat disc damping mechanism operative in conjunction with a compressive force generated by the torsion spring that allows axial translation of the pulley with disc wear and thus, pulley misalignment.

In response to belt force BF' at the pulley, the spaced bushings are loaded BL1, BL2 in opposite directions. As the bushings wear, the pivot-pin will cock with attendant pulley misalignment. As the friction surface of the disc type damping mechanism wears, the pulley will move in a direction PM resulting in additional pulley misalignment.

SUMMARY OF THE INVENTION

In accordance with the invention, a tensioner is provided that is particularly useful in V-ribbed front-end accessory belt drive systems used in automotive applications where a minimum tensioner bulk combined with a maximum pulley alignment over the expected life of the tensioner is important. The belt tensioner of the invention is of the "Zed" type with: a pivot-arm, a pivot-pin connected on one side of the pivot-arm, a base member of generally "tube-pan" shape holding at least one bushing that supports the pivot-pin, a torsional spring with one end constrained and attached to the pivot-arm and another end constrained and attached to the base. The base member includes a cantilevered inner wall, a cantilevered outer wall, and a bottom wall interconnecting the inner and outer walls. The base member is oriented with its bottom wall juxtaposed the pivot-arm to provide rigidity for supporting the pivot-pin. The pivot-pin has one end connected to and protrudes from a side of the pivot-arm. The pivot-pin has another end spaced away from the pivot-arm to which a second end of the spring is connected. In a preferred embodiment, the second end of the spring is operatively connected to a damping mechanism which produces a reacted force in generally the same direction as a belt force applied to the pulley by a tensioned belt of a belt drive system. An advantage of the invention is that a reduced bulk tensioner is provided which has improved rigidity for supporting a pivot-pin and has the option of including a reacted spring force that may be oriented to be in generally the same direction as a hub load so as to generally balance a loading on spaced bearings for good pulley alignment.

These and other objects or advantages of the invention will be apparent after reviewing the drawings and description thereof wherein;

FIG. 1 is a cross-sectional view of the tensioner of the invention taken along the line 1—1 of FIG. 2;

FIG. 2 is a partial schematic view illustrating various components and forces associated with the tensioner;

FIG. 3 is a partial cross-sectional view similar to FIG. 2 illustrating a damping mechanism, and is taken along a line 3—3 of FIG. 1 but where the view is rotated to have the same orientation of components as in FIG. 2;

DESCRIPTION OF PREFERRED EMBODIMENTS

Figure 5:
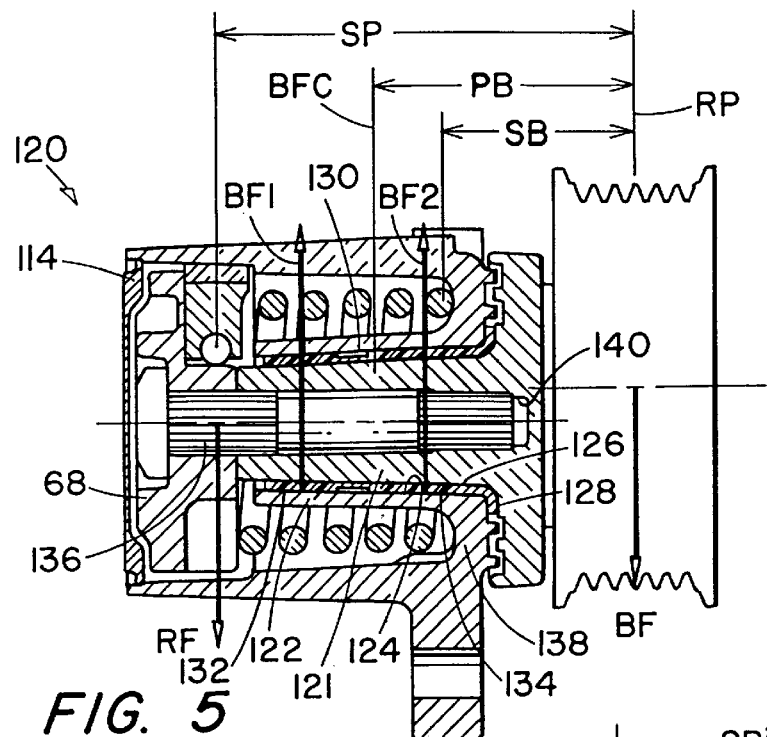
FIG. 5 is a view similar to FIG. 1 but showing an alternate embodiment of the invention.

Referring to FIGS. 1–4, a tensioner 10 with a pulley 12 is typically used in conjunction with a belt drive system 14 that includes a belt 16 constrained by several pulleys (not shown) and including the tensioner pulley 12. The tensioner pulley 12 engages the belt 16 to adjust belt tension. When engaged with the belt, the tensioner pulley 12 receives a belt load in the form of belt tension T1, T2 of adjacent belt spans 18, 20. The belt tension T1, T2 (or load) combine to generate a belt force component BF along a bisector or an angle formed between the belt spans 18, 20. The belt force component being axially offset from a pivot-pin 22 of the tensioner generates a complicated hub load including forces and moments that are symbolically (i.e. not specifically) represented by the arrow HL.

The tensioner 10 is of the mechanical type and includes a base member 24, a torsion spring 26, a pivot-arm 28 connected to the pivot-pin and a ball bearing 30 attached to the pivot-arm and rotatably mounting the pulley 12. The pivot-arm 28 is rotatably disposed with respect to the base member.

The base member 24 with its generally "tube-pan" shape has a cantilevered inner wall 32 having a bore 34, a cantilevered outer wall 36, and a bottom wall 38 that interconnects the inner and outer walls. The base member 24 is oriented so that its bottom wall 38 is juxtaposed the pivot-arm and with an open end 40 facing away from the pivot-arm. Ears 42, 44 with bolt receiving holes 46 may be integrally formed of the base member and used as a means for attaching the tensioner with bolts 47, 48 to an engine (not shown) to be part of the belt drive system.

The pivot-pin 22 is connected at one end 50 to the pivot-arm 28. In the preferred embodiment shown, the pivot-pin is formed as an integral part of the pivot-arm. Optionally, a labyrinth seal 52 is formed of a circumferential portion 54 of the pivot-arm and an adjacent circumferential portion 56 of the bottom wall. The pulley 12 is rotatably mounted to the pivot-arm 28 such as by means of the ball bearing 30 on a stub shaft 58 formed of the pivot-arm. The bearing is retained on the stub shaft such as by means of a bolt 60.

Bushings 62, 64 are preferably of the polymeric type and are located in the bore 34 of the inner wall to support the pivot-pin with the attached pivot-arm. The bushings may include a flange 66 as a thrust bearing between the bottom wall and pivot-arm. Optionally, a single bushing may be used to support the pivot-pin where the bushing has two spaced surfaces such as hereinafter shown in FIG. 5.

Figure 4:
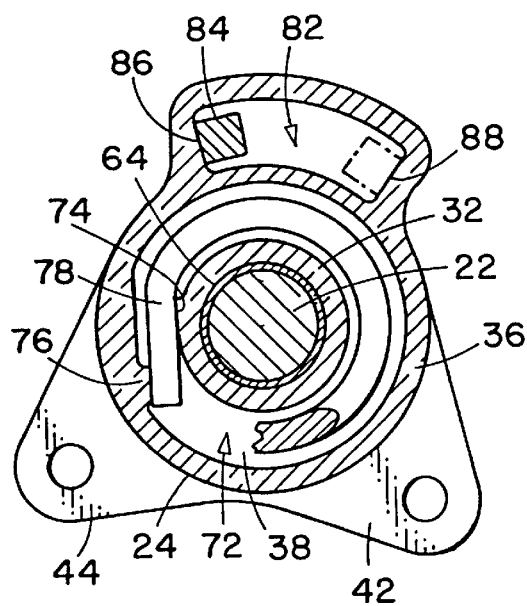
FIG. 4 is a view taken along the line 4—4 of FIG. 1.

A cap 68 is attached to a second end 71 of the pivot-pin such as by means of a threaded bolt or a serrated fastener 70 as shown. The torsional spring 26 is located in an annular spring receiving cavity 72 defined between the inner 32 and outer 36 walls of the base member. As illustrated in FIG. 4, the base member 24 has two spaced points 74, 76 formed of projections of the base member where point 74 is formed of the inner wall 32 and point 76 is formed of the outer wall 36 for constraining a first end 78 of the spring.

Optionally, a stop to limit angular movements of the pivot-arm may be included and formed between the base member and pivot-arm which is best illustrated in FIG. 4. An arcuate slot 82 or groove is formed in the base member in a position juxtaposed the pivot-arm. A projection 84 formed of the pivot-arm protrudes into the slot. The projection 84 in conjunction with stops 86, 88 formed of the member base member at the ends of the slot limits oscillatory movements of the pivot-arm. Projection 84 is shown positioned against stop 86 formed of the base and in dotted form against stop 88.

A second end 90 of the spring 26 is constrained or retained at one or more points at or near the second end 71 of the pivot-pin. In the embodiment illustrated by FIG. 3, the second end 90 of the spring 26 is constrained at a point near the second end of the pivot-pin by means of the cap 68 where at least one point 92 or spring contact portion is formed on the cap. A second point for constraining the end of the spring may be formed of the outer wall 36 such as to form a point similar to that as 76 of the base member, but in the preferred embodiment, the second point of spring constraint is by way of a damping mechanism that includes a shoe 94 with an outside arcuate friction surface 96 that engages a complimentary inside arcuate surface 98 formed of an inside wall portion of the outer wall of the base member to damp oscillatory movement of the pivot-arm. Optionally, the shoe has a lining 100 that defines the friction surface 96 and is attached to the shoe such as during molding of the shoe or such as by teeth 102 that fit into complementary portions formed of the shoe.

The shoe has a ramp surface 106 that engages a ramp surface 108 of a protrusion 110 formed of the cap. A second sliding surface 112 formed of the shoe defines a second point of contact for constraining the end 90 of the spring.

A closure member 114 such as of a plastic material is affixed to the open end 40 of the base member to seal the damping mechanism from contaminants.

Referring to FIG. 2, the shoe 94 imparts a reacted force 116 to the protrusion 110, and the spring end 90 imparts a reactive force 118 to the point of spring contact 92 of the cap. The two forces 116, 118 combine into a resultant force RF that is imparted to the end 71 of the pivot-pin and has a direction that is generally the same as the belt force BF (eg. ±10°). The resultant force, being in the same general direction as the belt force, may be used to optimize loads to the bushings for good pulley alignment as is hereinafter discussed.

The damping mechanism, including the shoe 94, moves the same number of degrees relative to the annular wall of the base member as that of the pivot-arm. The maximum angular movement of the damping mechanism is controlled by the arcuate slot 82 and stops 86, 88, which is about plus or minus 25 degrees. However, and during use, the pivot-arm need only move plus or minus an angle A (FIG. 3) which for most purposes, is within plus or minus 20 degrees. Of course, as the damping mechanism moves, the resultant force also changes direction substantially the same amount.

ADDITIONAL EMBODIMENTS

Referring to FIG. 5, another embodiment of a tensioner 120 of the invention is illustrated. The tensioner has substantially the same arrangement of parts of that previously described in conjunction with FIGS. 1–4. The main difference concerns the configuration of a pivot-pin 121 that is tapered to eliminate a machining operation and an inner wall 122 having a corresponding taper with a tapered bore 124 wherein a tapered bushing 126 having a thrust flange 128 is inserted. The bushing 126 has a groove 130 which divides the bushing into two, spaced-apart bearing surfaces 132, 134.

One of the features of the invention is that it is operable with torsion springs having a wide spring rate so as to induce high belt forces (i.e. up to 70 lbs.) into a power transmission belt. When higher belt tensions are required, an elongate, serrated fastener 136 may be used to attach the cap 68 to the pivot-pin 121 and improve the bending moment of the tapered pivot-pin. The pivot-pin having a length supported by the bushing 126 wherein the fastener 136 has a length greater than the length of the pivot-pin supported by the bushing. The use of a pin with longitudinal serrations has the advantage of permitting the cap to be rotated to a desired angular position relative to the pivot-arm about a longitudinal axis of the pivot-pin to adjust the torsional spring rate to within a small tolerance band of, for example, plus or minus 3 pounds. The serrated bolt is pressed into position which cuts complimentary longitudinal serrations in the cap and bore 140.

The operation of the tensioner of FIG. 5 is substantially the same as that of FIG. 4. Therefore, the operation of the tensioner is primarily shown in conjunction with FIG. 5 where the pivot-arm has been rotated to its belt tensioning position for engagement with a power transmission belt (not shown). A belt introduces a belt force BF into the pulley and the damping mechanism introduces a reactionary resultant force RF that is substantially in the same direction as the belt force. In response thereto, the bearing surfaces 132, 134, support the pivot-pin with two bearing forces BF1, BF2 which are substantially in the same direction but opposite those of the belt force and the reactive force. The bearing surfaces can be sized for an average bearing pressure so that they radially wear at substantially the same rate. With such an arrangement of component parts, the pulley has good alignment over a long period of time. In other words, the wear of the bearings are not such that they would allow the pivot-pin to cock over a long period of time.

The support for the pivot-pin of the tensioner of the invention has a greater stiffness than that of a comparable prior art tensioner because the bottom wall of the base member that supports the inner wall (i.e. the pivot-pin support wall) is offset as little as possible from a radial center plane RP for the pulley for a Zed type tensioner. As illustrated in FIG. 5, the bottom wall 138 is located from the radial center plane RP for the pulley about the same distance SB from where the spring is connected to the base member. A radial center plane BFC for bearing forces (i.e. the midpoint between the bearing forces BF1 and BF2) is located a distance PB from the radial plane. The other end of the spring is connected to the pivot-arm/cap a distance SP from the raidal plane. As easily determined from FIG. 5, the ratio of SB to PB is less than one and the ratio of SP to PB is greater than one. In contrast, the prior art has opposite ratios and which is reflective of a different construction and stiffness.

Figure 6:
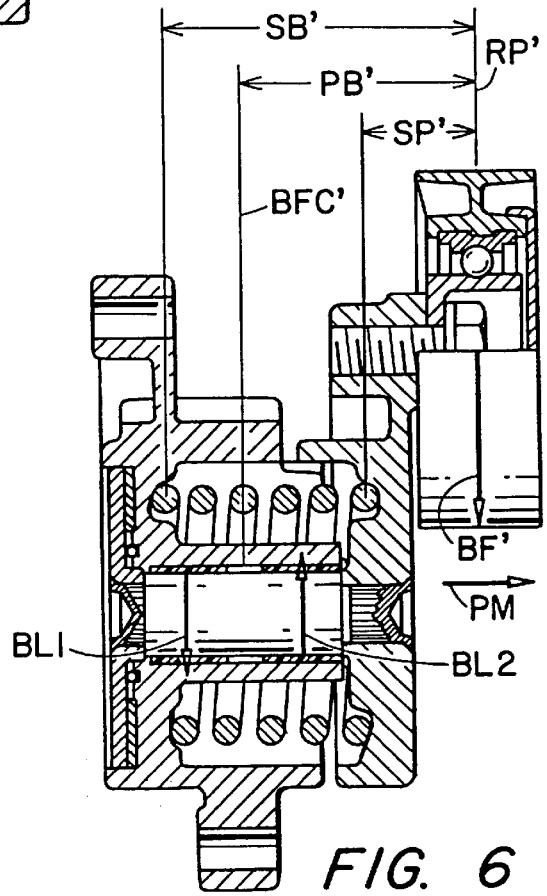
FIG. 6 is a cross-sectional view of a prior art tensioner.

Referring to the prior art tensioner of FIG. 6, the bottom wall is located from a radial center plane RP' for the pulley about the same distance SB' where the spring connects to the bottom wall. A radial center plane BFC' for a midpoint for the bearing load BL1 and BL2 is located a distance PB' from the radial plane RP' for the pulley; and the spring is connected to the pivot-arm a distance SP' from the radial plane of the pulley. As can readily be determined from FIG. 6, the ratio of SB' to PB' is greater than one and the ratio of SP' to PB' is less than one.

Figure 7:
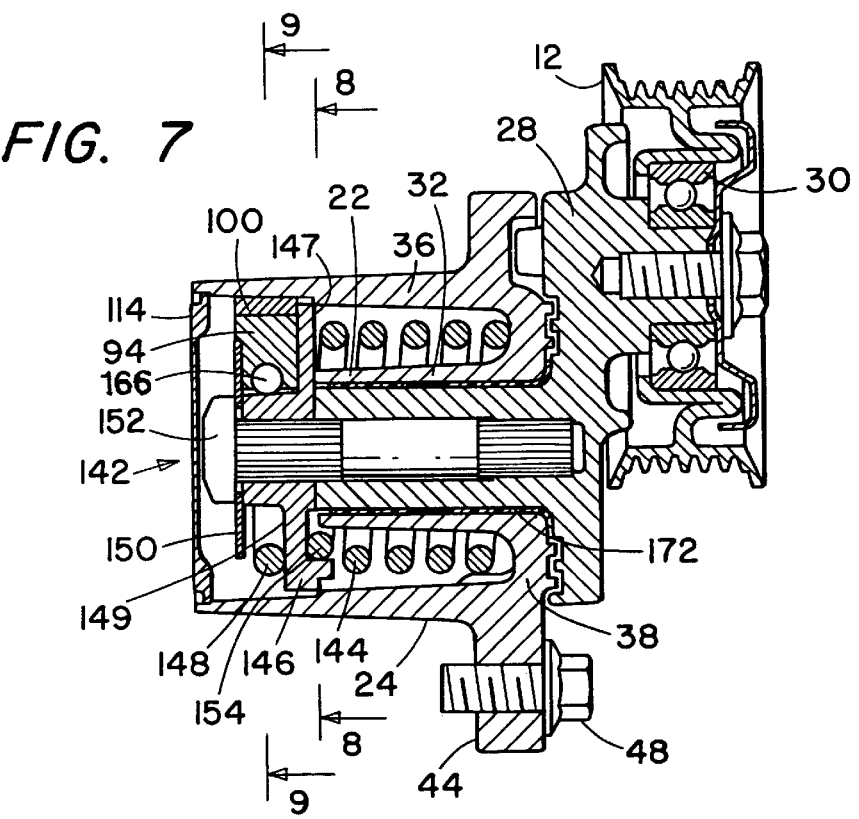
FIG. 7 is a view similar to FIG. 1 but showing another embodiment of a tensioner of the invention.
Figure 8:
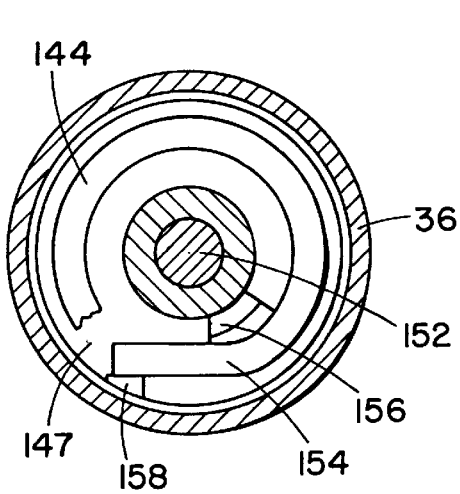
FIG. 8 is a view taken along the line 8—8 of FIG. 7.
Figure 9:
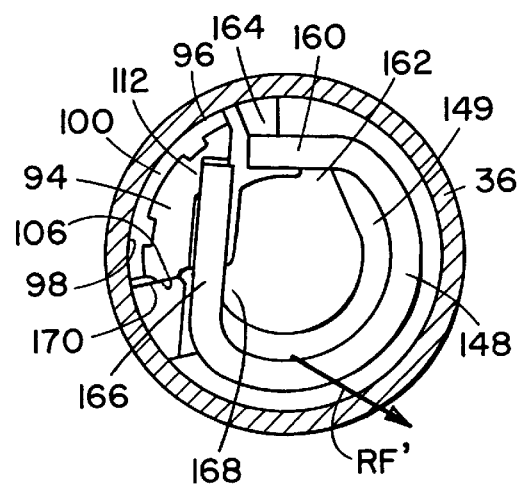
FIG. 9 is a view taken along the line 9—9 of FIG. 7 but where the view is rotated to have substantially the same orientation as FIG. 3.

An additional embodiment of a tensioner 142 of the invention is disclosed in FIGS. 7–9. The tensioner has substantially the same arrangement of parts as described in conjunction with FIG. 1–6 except for a differently configured cap, the provision of a second damping spring, and a constant damping provision produced in conjunction with the second spring.

Referring to FIGS. 7 and 8, the tensioner 142 has a torsion spring 144 for biasing the position of the pivot-arm 28, a cap 146, a damping spring 148 comprising at least a partial coil of a torsion spring, a washer 150, and an elongate fastener 152. The torsion spring 144 is constrained to the base member 24 at two spaced points and in the same manner as illustrated in FIG. 4 for the tensioner of FIG. 1. However, the other end 154 of the spring 144 is constrained at two points 156 and 158 which are projections formed of a first side 147 of the cap 146 as illustrated in FIG. 8.

Referring to FIG. 9, the damping spring 148 has one end 160 constrained a two points 162, 164 formed as projections on a second and oppositely facing side 149 of the cap 146. A second end 166 of the damping spring 148 is constrained at a point 168 or a projection formed of the cap. The second end of the spring is constrained at a second point by way of a damping mechanism similar to that described for FIG. 3 and with the same parts which includes a shoe 94 with an outside friction surface 96 that engages a complimentary inside arcuate surface 98 which is an inside wall portion of the base member. The shoe has a ramp surface 106 that engages a ramp surface 170 formed of the cap and a sliding surface 112 that defines a second point of spring contact for constraining the end 166 of the spring.

The orientation of the damping mechanism of FIG. 9 is arranged to be substantially in the same circumferential position as that of the damping mechanism of FIG. 3 so that it provides a similar reaction force RF' that is oriented to be substantially the same as that depicted in FIG. 5. With such an orientation, the reactionary force of the damping spring is used to substantially balance the loads of the belt force as carried by the bushing 172 in substantially the same manner as depicted and explained in conjunction with FIG. 5. However, the reactionary force RF' remains a constant force because the damping spring 148 exerts a constant force on the shoe. In other words, the damping force does not vary with the angular position of the pivot-arm in the manner as exemplified by the tensioner of FIG. 5.

FIGS. 7 and 8 are illustrative of how the functioning of the tensioner can be easily changed from one having variable damping to one having constant damping by interchanging a minimal number of the component parts, namely two springs, and a cap.

The foregoing detailed description is used for purpose of illustration and is not intended to limit the scope of the invention which is to be determined by the appended claims.

What is claimed is:

1. A tensioner for tensioning a power transmission belt including a pivot-arm; a pulley attached to the pivot-arm for engaging the belt and receiving a belt load; a pivot-pin attached to the pivot-arm; a base member having generally a tube-pan shape with a cantilevered inner wall having a bore, an outer wall, an annular spring receiving cavity defined between the inner wall and the outer wall, an open end, and a bottom wall interconnecting the inner wall and the outer wall and facing the open end; at least one bushing supporting the pivot-pin; a spring operatively connected between the pivot-arm and the base member; a damping mechanism; and wherein the improvement comprises:

the base member oriented with a first side of the bottom wall juxtaposed to the pivot-arm and a second side of the bottom wall facing the spring and wherein the open end of the base member faces away from the pivot-arm and said pivot-arm is rotatably disposed with respect to the base member; and the pivot-pin having a first end connected to and protruding from a side of the pivot-arm and having a second end connected to the spring.

2. The tensioner as claimed in claim 1 comprising:

a cap attached to the second end of the pivot-pin; and the spring having a first end constrained by two spaced points of the base member near the bottom wall, and having a second end constrained by at least one spring contact portion comprising a portion of the cap.

3. The tensioner as claimed in claim 2 comprising:

the second end of the spring engaging and pressing a shoe of the damping mechanism against a juxtaposed inside portion of the outer wall of the base member to damp oscillatory movement of the pivot-arm.

4. The tensioner as claimed in claim 3 wherein the second end of the spring is retained in a position on the cap such that forces imparted by the spring to the cap combine into a resultant force that has a direction that is within ±10° of a direction of the belt load imparted to the pulley.

5. The tensioner as claimed in claim 2 wherein the spring contact portion is adjustable to a desired angular position relative to said pivot-arm about a longitudinal axis of the pivot-pin, and the cap is attached to the pivot-pin by a fastener.

6. The tensioner as claimed in claim 5 wherein the pivot-pin and the fastener have interdigitating, longitudinally oriented serrations.

7. The tensioner as claimed in claim 2 comprising the pivot-pin formed as an integral part of the pivot-arm and having a length supported by said at least one bushing and wherein a fastener attaches the cap to the pivot-pin wherein the fastener has a length greater than the length of the pivot-pin supported by the bushing.

8. The tensioner as claimed in claim 1 wherein an engagement of the spring with the base member is spaced a first distance (SB) from a radial center plane of the pulley, the pivot-pin is supported by two bearing forces, and a center plane of the two bearing forces is located midway between the two bearing forces and is spaced a second distance (PB) from the radial center plane of the pulley and wherein a ratio of the first distance (SB) to the second distance (PB) is less than one.

9. The tensioner as claimed in claim 1 comprising a closure affixed to the open end of the base member.

10. The tensioner as claimed in claim 1 wherein a labyrinth seal is formed by a circumferential portion of the pivot-arm and an adjacent circumferential portion of the first side of bottom wall.

11. The tensioner as claimed in claim 1 wherein the pivot-pin is formed as an integral part of the pivot-arm.

12. The tensioner as claimed in claim 1 comprising:

a cap attached to the second end of the pivot-pin and having a first side with two spaced points for constraining the spring and a second side;

the spring comprising a torsion spring having a first end constrained by two spaced points of the base member near the bottom wall, and having a second end constrained by the two spaced points of the first side of the cap; and a damping spring having a first end constrained by two spaced points of the second side of the cap, and a second end constrained by a third point of the second side of the cap, the damping spring engaging and pressing a shoe of the damping mechanism against a juxtaposed inside portion of the outer wall of the base member to damp oscillatory movements of the pivot-arm.

13. The tensioner as claimed in claim 12 wherein the damping spring comprises at least a partial coil of a torsion spring.

14. The tensioner as claimed in claim 13 wherein the second end of the damping spring is constrained in a position on the cap such that a reactionary force imparted by the damping spring to the cap and the pivot-pin has a direction that is within ±10° of a direction of the belt load imparted to the pulley.

15. A belt tensioner for tensioning a power transmission belt associated with an engine, comprising:

a pivot-arm;

a pulley attached to the pivot-arm for engaging the belt and receiving a belt load;

a pivot-pin attached to the pivot-arm and supported by at least one bushing;

a base member fixedly attachable to the engine and having generally a tube-pan shape with a cantilevered inner wall having a bore, an outer wall, an annular spring receiving cavity defined between the inner wall and the outer wall, an open end, and a bottom wall interconnecting the inner wall and the outer wall and facing the open end;

said base member oriented with the bottom wall juxtaposed to the pivot-arm and with the open end of the base member facing and spaced away from the pivot-arm wherein said pivot-arm is rotatably disposed with respect to the base member;

said pivot-pin having a first end connected to and protruding from a side of the pivot-arm, and having a second end;

a spring operatively connected between the base member and the pivot-arm, one end of the spring being constrained proximate the second end of the pivot-pin; and a damping mechanism.

16. The belt tensioner of claim 15 wherein an engagement of the spring with the base member is spaced a first distance (SB) from a radial center plane of the pulley, the pivot-pin is supported by two bearing forces, and a center plane of the two bearing forces is located midway between the two bearing forces and spaced a second distance (PB) from the radial center plane of the pulley and wherein a ratio of the first distance (SB) to the second distance (PB) is less than one.

* * * * *